Patented Nov. 24, 1931

1,833,396

UNITED STATES PATENT OFFICE

WRIGHT W. GARY, OF LOS ANGELES, CALIFORNIA, ASSIGNOR, BY MESNE ASSIGNMENTS, TO CANNON-PRUTZMAN TREATING PROCESSES, LTD., OF LOS ANGELES, CALIFORNIA, A CORPORATION OF CALIFORNIA

METHOD OF PURIFYING PETROLEUM PRODUCTS

No Drawing. Application filed June 30, 1928. Serial No. 289,607.

The subject matter of my invention is the chemical treatment of petroleum distillates and residues for the removal of the coloring matter and impurities contained therein.

The object of my invention is to treat these raw materials with alkalis and sulfuric acid in such manner as to obtain better colors and a higher degree of purity than have heretofore been obtainable, and in such manner as to obtain these results with a minimum consumption of chemicals, labor and oil.

The substantial basis of my invention is the application of the alkali or alkalis to the oil in the form of a mixture of such alkali with a powdered inert supporting agent, such mixture being formed into a cake in a filter press or equivalent apparatus and the oil being passed or forced through such cake and thus into intimate reactive contact with the chemical ingredient. This method of applying reagents to oil is described in detail in my copending application, Serial No. 270,593, entitled Method for producing reactions requiring hydration, filed April 16, 1928.

In the present disclosure I will repeat such parts of the said specification as are essential to the understanding of the present invention, but it will be understood that I do not here claim the materials or methods set forth in said copending application except in a certain combination herein set forth, which produces a new and useful result not heretofore described.

The treatment and purification of petroleum distillates or residues with sulfuric acid and alkalis is very old in the art of refining. It has heretofore been customary to intermix the oil with sulfuric acid, settle out or otherwise separate the acid sludge so formed, intermix the oil with an aqueous solution of the alkali, and wash out the salts and soapy reaction products with water. Finely pulverized alkalis in the solid form have also been used in place of alkaline solutions, and separation of the alkaline reaction products by various mechanical means or by washing with aqueous solutions of soaps and salts has been attempted in order to avoid the difficulties attendant on water washing of the alkaline oil.

It is well known that if the petroleum product be treated with a highly reactive alkali prior to the treatment with sulfuric acid, the function of the treatment throughout its entire course may be greatly facilitated and improved, and a far superior final result obtained.

The improvement in results is evidenced in the following particulars.

(a) The naphthenic acids and phenols present in the raw distillate are withdrawn without decomposition as water soluble salts of the alkali metal, and may be used as such or regained in a useful free condition by acidifying the aqueous solution.

(b) By relieving the petroleum of these bodies, which are more or less reactive with sulfuric acid, the relative volume of acid sludge (usually a waste or a nuisance product) is reduced. The effectiveness of the acid as a purifying and decolorizing agent is also materially increased, and the tendency of the sludge to entrain and carry away free oil is decreased.

(c) The alkali-reactive constituents being removed prior to the acid treatment, the final neutralization has to take care only of residual traces of mineral acid and of such acids as result from the action of the sulfuric acid on relatively stable hydrocarbons. The production of alkali reaction products in the neutralization step is thus reduced to a minimum, and thus the oil may often be neutralized and freed from alkali and reaction products without water washing. Or, if water washing is preferred, the formation of the partial or complete emulsions which cause large losses of purified oil are completely avoided. The time of contact with alkali is likewise reduced and the loss of color which, particularly with lubricating oils, follows long continued washing, is likewise obviated.

I am aware that attempts have been made to carry out a treatment of the raw stock with aqueous solutions of alkali, but such treatments are ineffective with volatile oils, because of the very limited contact between the alkali and the reactive constituents of the oil. In lubricating distillates it is easy to form the salts of the naphthenic acids and hydroxylated derivatives, by intermixture and heating with strong alkaline solutions, but these soapy salts are strong emulsifying agents and it is practically impossible to wash them from the oil without serious losses of oil due to emulsification and entrainment in the wash waters. Further, these soaps are readily decomposed by water, even in the presence of excess alkali, and thus are in part split into free alkali and free acid, the latter passing back into the oil, during the long continued washing process. Further, it is difficult to remove the last of the alkali from the oil by washing, particularly if it be viscous, and the presence of even a small proportion of alkaline water interferes seriously with the subsequent acid treatment. Finally, the washing process is tedious and expensive, and results in material loss of oil by evaporation, if the stock be light and volatile, or in severe oxidation and darkening if the oil be viscous.

By following my improved method, about to be described, all the advantages attendant on the initial removal of the alkali-soluble bodies may be attained without any of the difficulties or disadvantages which have heretofore prevented the use of the old method involving washing of the alkaline oil. My improved process is particularly adapted to cracked gasolines and to lubricating oils, but it gives good results on all kinds and qualities of petroleum distillate or residue, and it will be understood that the specific references made to its use are by way of example only, and that my invention is not limited thereby.

A step preliminary to the application of my invention is the preparation of a suitable treating material, as fully described in my copending applications. For this purpose I first select a porous material insoluble in water and inert to any of the constituents of petroleum. Such materials are charcoal, finely porous varieties of coke or pumice, magnesium silicate (sepiolite), or preferably a diatomaceous or infusorial earth. Any of these materials may be used in their raw form, after grinding to a fine powder, but I prefer to calcine earth materials to increase their porosity and to destroy any possible tendency to assume a muddy condition when wet with water.

To the finely ground inert material I add a suitable quantity, which may be from 15% to 30% more or less, of an alkali capable of reacting with the acidic constituents of petroleum. Such alkali may be a hydrate or a carbonate of an alkali metal or a hydrate of an alkali earth metal. On account of its cheapness, high reactivity and low combining weight I prefer commercial sodium hydrate to other alkalis for this purpose. The percentage composition above stated is particularly suited to a mixture of sodium hydrate with diatomaceous earth, but it is a preferred proportion only and a greater or less proportion of alkali may be used without departing from the spirit of my invention.

The actual admixture of inert powder and alkali may be effected either wet or dry. The carbonates may be simply ground to a fine powder, the finer the better, and stirred or tumbled with the inert powder until the two are thoroughly and evenly intermixed. The hydrates are deliquescent and can hardly be handled in so simple a manner. A desirable procedure is to start with a granular or flake alkali and a portion of the inert material, wetting the mixture with enough of the oil to be treated to exclude air, and grind the triple mixture, which may be either a dampened mass or a thin paste or cream, in a ball or other suitable mill, until the alkali is reduced to a fine powder and thoroughly diffused throughout the mass. The remainder of the inert powder may then be added and the whole thoroughly blended.

A somewhat more costly but decidedly more efficient material may be prepared by first dissolving the alkali in water to form a strong solution, blending this solution with the powdered inert material until the solution is evenly diffused and the entire mass dampened, and then evaporating out the water. This may readily be done with the carbonates and a siliceous earth, or with the hydrates and charcoal, pumice or sepiolite, but where the hydrates are thus applied to a siliceous earth great care must be taken in drying or a fused mass of sodium or other silicate will result. Air drying and turning, or drying on trays with warm air, will give satisfactory products, but only the gentlest heating is permissible. The product of such mixtures requires to be reground after drying, as it is recemented by the alkali.

The mixture of alkali and inert supporting material having been made and reduced to a powder is formed into a layer or cake in any convenient manner. Thus, it may be suspended in a small portion of the oil to be treated and the magma forced into a filter press, where the powder will form a cake on and adhering to the cloth; or the powder may be formed into a layer in the bottom of a percolating vessel. The manners of forming the cake and of passing the oil therethrough are no part of my present invention, and both the apparatus used and the form of cake produced may be varied at will, according to convenience and with regard to the kind and quantity of oil to be passed through the cake. Thus, gasoline may be handled in a percolator, while viscous oils would necessarily require a pressure filter.

The cake being formed, I carry out the first step in my improved process by passing the oil through the cake. The oil may be a petroleum distillate from a condenser or a dephlegmator, or a residue from the steam reduction of a distillate or of a crude oil. If the oil to be treated is a nonviscous product such as gasoline or kerosene it should be passed through the cake without any heating; if it is a slightly viscous product such as gas oil, furnace distillate, cracking stock or light lubricant it may be gently warmed, while if it is a viscous lubricant or reduced stock it should be heated to a temperature of fluidity.

If the petroleum is of the nature of gasoline or kerosene, and particularly if it contains but a small proportion of bodies reactive with alkali, it may be passed through the cake dry or with such traces of water as may already be present. In such case the reaction product, formed by contact of the reactive constituents of the oil with the alkali in the cake, will remain in the cake until the alkali is exhausted or in some cases will be slowly extruded from the cake as minute drops of tarry material which are insoluble in the oil and which will separate from it on standing for a short time. But if the oil contain more than say one percent of its volume of acidic constituents it is preferable to introduce into it a small proportion of water prior to passing it through the cake. This water should be completely and finely dispersed in the oil so as to be brought into even contact with all parts of the surface of the cake.

A very satisfactory way of dispersing the water in the oil is to inject wet steam in very fine jets into the flow stream of oil advancing toward the filter means. If the heating simultaneously produced be objectionable, as it would be, for example, in the case of a cracked gasoline (which would usually require the addition of water) the intermixture may be produced mechanically, as by injecting needle jets of water into a flow stream of the oil and passing the latter through a beater or emulsifying apparatus. It is undesirable to depend on producing intermixture in a batch and thereafter to feed the mixture to the filter, unless the oil is sufficiently viscous to completely emulsify the water or unless the feed tank be kept in continuous agitation during the entire feeding period. It is most essential that the water be fed in an even and controlled ratio to the oil feed, so that its action on the cake material may be continuous rather than intermittent.

The quantity of water required is that quantity which will dissolve the alkali reaction product as fast as formed but which will not suffice to hydrolize it or to set up emulsification within the cake. This quantity or proportion cannot be conveniently predetermined, but it may readily be controlled during the course of the treatment by observing the condition of the effluent from the cake. Thus, if the oil retains its original color and odor the water feed is undoubtedly too small to maintain the desired reaction. If the oil is observed to be paler or sweeter than the raw stock but no aqueous effluent appears after a reasonable time the water feed is probably somewhat too small. This will also be indicated by a poor demulsification test with alkali. If the watery portion of the effluent is voluminous and of a milky color the water feed is too large.

When the correct proportion of water is being fed the aqueous portion of the effluent should be strongly discolored, often darker than the oil, and if from a lubricating stock may often be of an opaque brown. It should be substantially clear in thin layers, and should be completely soluble in water. The oil, if originally of a dark color, should be considerably bleached, the offensive odor of cracked or sulfurous distillates should be materially improved, and the oil after separation from the aqueous effluent should be clear in thin layers or when diluted with gasoline, and should show a practically perfect demulsification test with water, brine or alkali.

The combined effluent from the press, consisting of droplets of alkaline reaction product suspended in clean oil, can be separated by gravity difference alone, but the manner of separation will be governed by the viscosity of the oil. Thus, the aqueous drops will settle so rapidly from gasoline or kerosene that they may be removed by merely passing the stream through a separator of the static type, which operates merely to withdraw an aqueous layer from the lower and an oil layer from the upper portion of a settling shell. Oils of intermediate viscosity may require several hours settling in a tank where the mixture may remain perfectly quiescent. This will usually suffice also for lubricating oils if the temperature is not allowed to fall, but extremely viscous oils may require to be gently centrifuged. With viscous oils it is most important that press discharges and conductor pipes be streamlined and of ample area, as turbulence on the discharge side of the cake may produce emulsification of the oil with the once separated soap solution.

The above treatment should completely remove from the oil all constituents reactive with strong alkaline solutions, such as the naphthenic acids, the phenols and their sulfur substitution products, some of the aliphatic sulfur compounds, highly unsaturated aliphatic hydrocarbons such as the diolefins, free sulfur in solution, hydrogen sulfid, and in general all bodies capable of forming water soluble compounds with an alkali metal.

The next step in my improved process is to treat the oil with sulfuric acid. This operation is well known and understood, and may be performed either continuously or intermittently and with only such precautions as would be taken in treating an oil of the same class which had not been subjected to preliminary. The only exception is that a materially smaller dose of acid will be required to produce any desired degree of purification or decolorization. In treating cracked gasoline in particular, and still more particularly such as is produced from vapor phase processes, the required dosage of acid will be very much reduced, and care should be taken not to use more than the minimum quantity if the best final results as to quality of product are to be obtained.

The quantity of acid to be used in the acid treatment will of necessity vary widely with the nature and condition of the oil and with the desired color and condition of the finished oil. I may state as suggestive quantities, for straight-run gasoline made from crude oil, from ¼ pound to 1 pound per barrel of oil; for cracked gasoline, from ½ pound to 3 pounds per barrel; for kerosene, from 1 pound to 10 pounds per barrel and for lubricating oils, from 2 pounds to twenty pounds or even more per barrel. I do not restrict myself to any given acid dosage because of the extremely wide variation required under different conditions and for different oils, but the dosage will in any case be less than the dosage required where the aforesaid preliminary treatment with an alkali-containing cake is not applied.

Following the acid treatment the acid sludge, which will be in less than the usual quantity for any given grade of oil, is settled and withdrawn in the customary manner. The usual care should be taken to remove the sludge as completely as possible before proceeding to the final neutralization.

Neutralization of the acidified oil, in which traces of sulfuric and sulfurous acids and acid reaction products are withdrawn, may be performed either by the use of a second alkali cake applied in substantially the above manner, or by acting on the oil with aqueous solution of an alkali or with solid pulverized alkali and thereafter washing with water in the usual manner, or by adsorbing the acids into clay or similar porous material.

According to the first named alternative, which I prefer, a cake is prepared and used as above described except that it is somewhat preferable to use sodium carbonate instead of sodium hydrate and that only a minute quantity of water, if any, is needed. If a lubricating oil, and if the sludge has been gathered with water at the end of the acid treatment, the cloud of water remaining in the oil will be sufficient. The oil separating from the effluent from this cake will be finished neutral oil, requiring no further treatment, and will be free from acid, alkali, soaps and salts.

On account of the prior removal of the acidic constituents the quantity of alkali reaction product formed on treating the acidified oil will be much reduced, and it will usually be possible to wash the oil with water after neutralizing it with aqueous or solid alkali in the usual manner without incurring the losses and difficulties which would otherwise accrue. This operation is well known and understood and need not be described.

For the same reason the acidified oil as above prepared is particularly suited for neutralization by the action of an adsorbent. These bodies, the nature and function of which are very well known, act by physically withdrawing the acid constituents rather than by converting them into neutral salts, the powdered adsorbent being mixed and usually heated with the oil and then filtered out. Clays and earths classed as fuller's earth are used for this purpose and the deacidification is usually attended by a bleaching of the color of the oil, the presence of acid in the oil increasing the effectiveness of the earth as a decolorizing agent. These adsorbents are highly effective in removing mineral and sulfonic acids, such as are left behind or produced by the sulfuric acid treatment, but have little efficacy for removing naphthenic acids. The complete prior removal of these acids, as contemplated in my process, makes it possible and desirable to use this method of neutralization in many cases where it would not be feasible to apply it to a stock which has been acid treated without such prior removal.

I claim as my invention:

1. The method of purifying a petroleum oil which comprises: removing alkali-reactive constituents from said oil by passing the untreated oil through a substantially dry cake of pulverized inert porous material mixed with alkali and parting from the effluent any reaction product which may pass with said oil through said cake; treating the effluent oil with sulfuric acid; separating the acid sludge so formed, and neutralizing the acidified oil.

2. The method of purifying a petroleum oil which comprises: removing alkali-reactive constituents from said oil by passing the untreated oil through a substantially dry cake of pulverized porous material containing sodium hydrate and parting from the effluent any reaction product which may pass with said oil through said cake; treating the effluent oil with sulfuric acid; separating the acid sludge so formed, and neutralizing the acidified oil.

3. The method of purifying a petroleum oil which comprises: removing alkali-reactive constituents from said oil by passing the untreated oil through a substantially dry cake of pulverized inert porous material intermixed with alkali and parting from the effluent any reaction product which may pass with said oil through said cake; thereafter, and without water washing, treating the effluent oil with sulfuric acid; separating the acid sludge so formed, and finally removing the acidity from the acidified oil.

4. The method of purifying a petroleum oil which comprises: removing alkali-reactive constituents from said oil by passing the untreated oil through a substantially dry cake of pulverized inert porous material containing sodium hydrate and parting from the effluent any reaction product which may pass with said oil through said cake; thereafter, and without water washing, treating the effluent oil with sulfuric acid; separating the acid sludge so formed, and finally removing the acidity from the acidified oil.

In witness that I claim the foregoing I have hereunto subscribed my name this 11th day of June, 1928.

WRIGHT W. GARY.